US008330874B2

(12) United States Patent
Yamamoto

(10) Patent No.: US 8,330,874 B2
(45) Date of Patent: Dec. 11, 2012

(54) VIDEO SIGNAL CONVERSION DEVICE, VIDEO SIGNAL CONVERSION METHOD AND VIDEO DISPLAY DEVICE

(75) Inventor: Shuzo Yamamoto, Aichi (JP)

(73) Assignee: Sony Corporation (JP)

( * ) Notice: Subject to any disclaimer, the term of this patent is extended or adjusted under 35 U.S.C. 154(b) by 975 days.

(21) Appl. No.: 12/214,305

(22) Filed: Jun. 18, 2008

(65) Prior Publication Data

US 2009/0002551 A1     Jan. 1, 2009

(30) Foreign Application Priority Data

Jun. 29, 2007    (JP) ................ P2007-172902

(51) Int. Cl.
*H04N 7/01*      (2006.01)
*H04N 5/46*      (2006.01)
*H04N 5/50*      (2006.01)
*H04N 5/445*     (2011.01)

(52) U.S. Cl. ........... 348/732; 348/441; 348/558; 725/56
(58) Field of Classification Search .................. 348/558, 348/441, 732, 731; 725/56
See application file for complete search history.

(56) References Cited

U.S. PATENT DOCUMENTS

| 5,614,956 | A | * | 3/1997 | Matsuura | 348/556 |
| 5,703,657 | A | * | 12/1997 | Maruoka et al. | 348/554 |
| 5,917,552 | A | * | 6/1999 | Van Court | 348/558 |
| 6,124,893 | A | * | 9/2000 | Stapleton | 348/441 |
| 6,359,580 | B1 | * | 3/2002 | Morrison | 348/731 |
| 6,384,867 | B1 | | 5/2002 | Seino et al. | |
| 6,972,803 | B2 | * | 12/2005 | Seth-Smith et al. | 348/558 |
| 7,379,122 | B2 | * | 5/2008 | Bae et al. | 348/732 |
| 7,380,263 | B2 | * | 5/2008 | Shintani | 725/59 |
| 7,532,252 | B2 | * | 5/2009 | Chen | 348/558 |
| 2004/0258161 | A1 | * | 12/2004 | Castillo et al. | 375/240.25 |
| 2005/0076385 | A1 | * | 4/2005 | Li et al. | 725/111 |

(Continued)

FOREIGN PATENT DOCUMENTS

JP    2000-338925 A    12/2000

(Continued)

OTHER PUBLICATIONS

Office Action from Japanese Application No. 2007-172902, dated Mar. 6, 2012.

*Primary Examiner* — James R Sheleheda
(74) *Attorney, Agent, or Firm* — Lerner, David, Littenberg, Krumholz & Mentlik, LLP

(57) ABSTRACT

A video signal conversion device performs the process of: selecting a selected video signal out of two or more video signals input; recognizing the signal type of the selected video signal; converting, in accordance with the result of recognition, the selected video signal into a display signal format suitable for a display section and supplying it to the display section; selecting a target video signal from a group of unselected video signals not including the selected video signal, and recognizing the signal type of the target video signal; generating a piece of video information from the result of recognition and storing the piece of video information in a storage section; and reading out, when accepting a switching instruction that instructs to select another video signal as a selected video signal, a piece of video information corresponding to it from the storage section and converting it into the format.

6 Claims, 4 Drawing Sheets

U.S. PATENT DOCUMENTS

| | | | |
|---|---|---|---|
| 2005/0086693 A1* | 4/2005 | Shintani | 725/54 |
| 2006/0085828 A1* | 4/2006 | Dureau et al. | 725/100 |
| 2006/0238651 A1* | 10/2006 | Suzuki | 348/558 |
| 2007/0064150 A1* | 3/2007 | Lee | 348/468 |
| 2007/0067813 A1* | 3/2007 | Yen | 725/95 |
| 2009/0204995 A1* | 8/2009 | Kang et al. | 725/50 |

FOREIGN PATENT DOCUMENTS

| | | |
|---|---|---|
| JP | 2003323168 A | 11/2003 |
| JP | 2004219726 A | 8/2004 |
| JP | 2005258291 A | 9/2005 |
| JP | 2005303394 A | 10/2005 |

* cited by examiner

VIDEO SIGNAL CONVERSION DEVICE, VIDEO SIGNAL CONVERSION METHOD AND VIDEO DISPLAY DEVICE

CROSS-REFERENCE TO RELATED APPLICATIONS

The present application claims priority from Japanese Patent Application No. JP 2007-172902, filed in the Japanese Patent Office on Jun. 29, 2007, the entire content of which is incorporated herein by reference.

BACKGROUND OF THE INVENTION

1. Field of the Invention

The present invention relates to a video signal conversion device, video signal conversion method, and video display device, and is preferably applied to a television device, for example.

2. Description of the Related Art

A television device, which includes a television broadcast receiving circuit to receive a television broadcast wave and is designed to display television program's images on a display, has been popular.

The television device usually has a plurality of input terminals into which video signals are input from the outside. When receiving video signals via the input terminals from an external video device, such as a Digital Versatile Disc (DVD) recorder or a game machine, the television device displays the images on a display.

There has been a variety of video signals: video signals for analog television broadcasting present the aspect ratio of 4:3 while those for digital television broadcasting present the aspect ratio of 16:9. Moreover, digital television programs are being broadcast in different formats, each of which has a different resolution, such as 480p (Progressive), 720p or 1080i (Interlace).

Some television devices are equipped with a display section such as a liquid crystal display or a plasma display panel: This kind of display section is different from multiscan-type displays, such as Cathode Ray Tube (CRT), because the positions of the display pixels on a liquid crystal display and a plasma display panel do not change. In order to appropriately drive each pixel of such a display section, display video signals supplied to the display section should match the format of the display section, such as the number of pixels on the display section.

Meanwhile, as disclosed in Patent Document 1 (see Jpn. Pat. Laid-open Publication No. 2000-338925 (FIG. 1)), there is a video display device (also referred to as television device) that is designed to distinguish the input video signals to convert them into a suitable video signal format for its display section. The television device therefore can display images from various video signals.

SUMMARY OF THE INVENTION

However, if the above television device fails to distinguish the video signals, it may not be able to display images appropriately, like noises appearing on the images or resulting in totally unrecognizable. Accordingly, the television device should distinguish the video signals as accurately as possible.

But such an accurate distinguishing process takes much more time, and, when an input terminal is switched to another input terminal by a user, may force a user to wait for a while before an image of video signals supplied from the switched input terminal is displayed.

The present invention has been made in view of the above points and is intended to provide a video signal conversion device and video signal conversion method that can start, immediately after the video signal input is switched to another type of video signal, a conversion process to it, and a video display device that can display an image immediately after the video signal input is switched to another type of video signal.

In one aspect of the present invention, a video signal conversion device includes: a selection section that selects a selected video signal out of two or more video signals input in accordance with a selecting instruction supplied from a predetermined operation section; a selected video signal distinguishing section that recognizes the signal type of the selected video signal; a conversion processing section that converts, in accordance with the result of recognizing the signal type of the selected video signal, the selected video signal into a display signal format suitable for a predetermined display section and then supplies the converted signal to the display section; a target video signal distinguishing section that controls the selection section to select a target video signal from a group of unselected video signals not including the selected video signal, and then recognizes the signal type of the target video signal; an information generation section that generates a piece of video information from the result of recognizing the signal type of the target video signal and then stores the piece of video information in a predetermined storage section; and a switch control section that reads out, when accepting from the operation section a switching instruction that instructs to select another video signal as a selected video signal, a piece of video information corresponding to the another video signal from the storage section and then controls the conversion processing section to convert the another video signal into the display signal format in accordance with the piece of video information.

Accordingly, when accepting a switching instruction that instructs to select another video signal, the device can immediately start the conversion process of the video signal by using the piece of video information stored in the storage section without performing the process of recognizing the signal type again.

In another aspect of the present invention, a video signal conversion method of a video signal conversion device that selects a selected video signal out of two or more video signals input in accordance with a selecting instruction supplied from a predetermined operation section, recognizes the signal type of the selected video signal, converts, in accordance with the result of recognition, the selected video signal into a display signal format suitable for a predetermined display section and then supplies the converted signal to the display section, the video signal conversion method comprising: a selection step of selecting a target video signal from a group of unselected video signals not including the selected video signal; a distinguishing step of recognizing the signal type of the target video signal; an information generation step of generating a piece of video information from the result of recognizing the signal type of the target video signal and storing the piece of video information in a predetermined storage section; and a switch control step of reading out, when accepting from the operation section a switching instruction that instructs to select another video signal as a selected video signal, a piece of video information corresponding to the another video signal from the storage section, converting the another video signal into the display signal format in accordance with the piece of video information and supplying the converted signal to the display section.

Accordingly, when accepting a switching instruction that instructs to select another video signal, the device can immediately start the conversion process of the video signal by using the piece of video information stored in the storage section without performing the process of recognizing the signal type again.

In another aspect of the present invention, a video display device comprising: a selection section that selects a selected video signal out of two or more video signals input in accordance with a selecting instruction supplied from a predetermined operation section; a selected video signal distinguishing section that recognizes the signal type of the selected video signal; a conversion processing section that converts, in accordance with the result of recognizing the signal type of the selected video signal, the selected video signal into a display signal format suitable for a predetermined display section and then regards the converted signal as a display video signal; a display section that displays an image of the display image signal; a target video signal distinguishing section that controls the selection section to select a target video signal from a group of unselected video signals not including the selected video signal, and then recognizes the signal type of the target video signal; an information generation section that generates a piece of video information from the result of recognizing the signal type of the target video signal and then stores the piece of video information in a predetermined storage section; and a switch control section that reads out, when accepting from the operation section a switching instruction that instructs to select another video signal as a selected video signal, a piece of video information corresponding to the another video signal from the storage section and then controls the conversion processing section to convert the another video signal into the display signal format in accordance with the piece of video information.

Accordingly, when accepting a switching instruction that instructs to select another video signal, the device can immediately start the conversion process of the video signal by using the piece of video information stored in the storage section without performing the process of recognizing the signal type again.

In that manner, when accepting a switching instruction that instructs to select another video signal, the device can immediately start the conversion process of the video signal by using the piece of video information stored in the storage section without performing the process of recognizing the signal type again. That realizes the video signal conversion device and video signal conversion method that can start, immediately after the video signal input is switched to another type of video signal, a conversion process to it, and the video display device that can display an image immediately after the video signal input is switched to another type of video signal.

The nature, principle and utility of the invention will become more apparent from the following detailed description when read in conjunction with the accompanying drawings in which like parts are designated by like reference numerals or characters.

DETAILED DESCRIPTION OF PREFERRED EMBODIMENTS

An embodiment of the present invention will be described in detail with reference to the accompanying drawings.

(1) Circuit Configuration of Television Device

Figure 1:
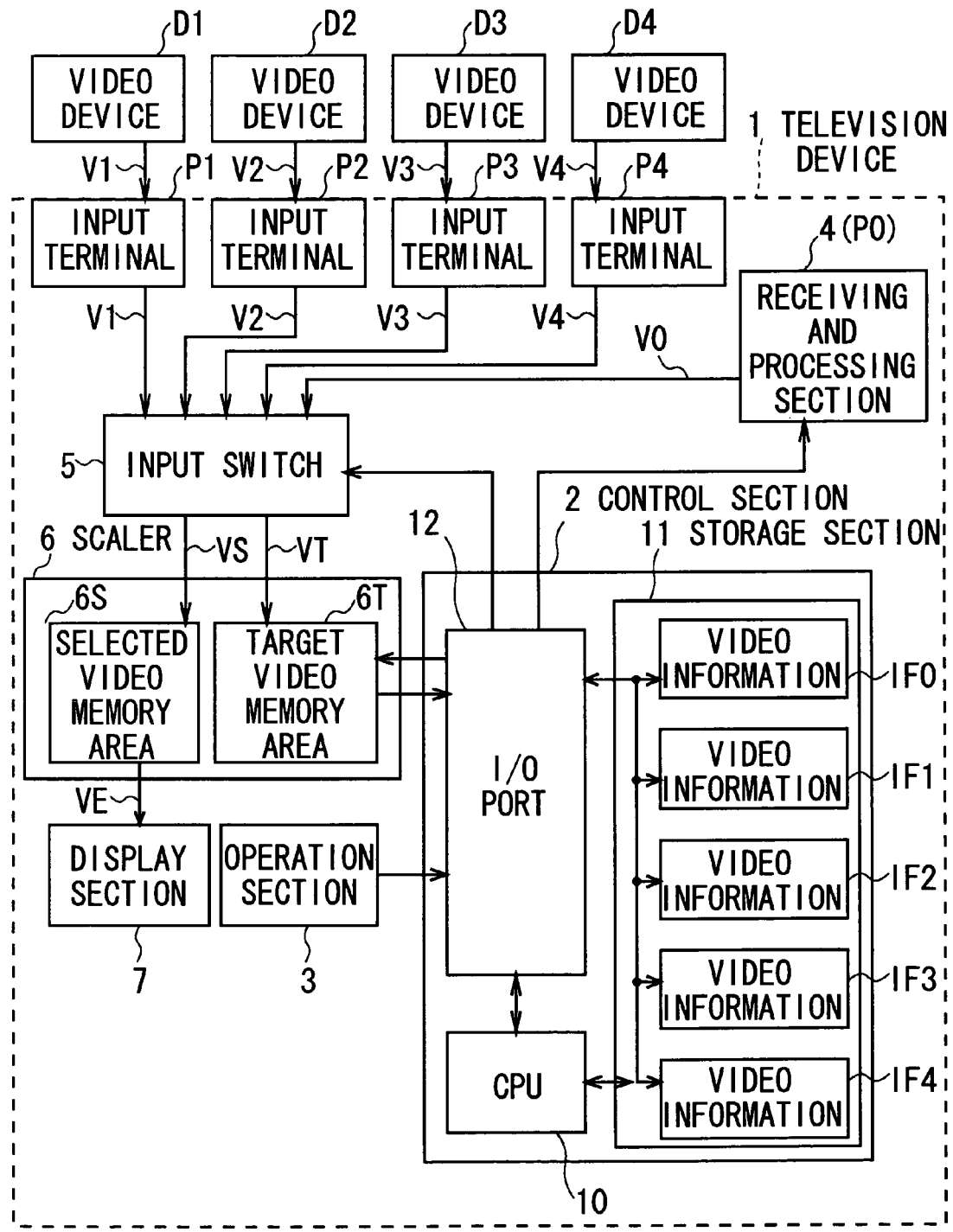
FIG. 1 is a block diagram illustrating the circuit configuration of a television device.

As shown in FIG. 1, a television device 1 is designed to display on a display section 7 an image based on video signals acquired by receiving television broadcast waves or those supplied from the outside.

A control section 2 takes overall control of the television device 1. The control section 2 includes a Central Processing Unit (CPU) 10 as its integral part and an Input/Output (I/O) port 12 that exchanges control commands, data or the like with a storage section 11 and other circuits. The storage section 11 is designed to store various kinds of data. The CPU 10 runs various programs and performs various arithmetic processes.

When an operation section 3 receives an operation instruction that a user input through an operation button or a remote controller (not shown), it supplies to the control section 2 an operation signal based on the operation instruction. Based on the operation signal, the control section 2 performs various processes.

A receiving and processing section 4 receives a television broadcast wave of a broadcast channel that a user has specified through the operation section 3, and then performs a predetermined demodulation process and the like to generate a video signal V0, which is then supplied to an input switch 5. Hereinafter, the receiving and processing section 4 will be regarded as one of input terminals P, especially as an input terminal P0.

Input terminals P1, P2, P3 and P4 receive from the outside video signals V1, V2, V3 and V4, respectively. The input terminals P1, P2, P3 and P4 then transfers the video signals V1, V2, V3 and V4 to an input switch 4. The input terminals P1, P2, P3 and P4 are connected to external devices D1, D2, D3 and D4, respectively: The external devices D1, D2, D3 and D4 for example are DVD recorders or game machines.

The input switch 5, under the control of the control section 2, selects one of the input terminals P0, P1, P2, P3 and P4 (the selected input terminal will be referred to as "selected input terminal PS), and then transmits to a scaler 6 an video signal V supplied from the selected input terminal PS as a selected video signal VS: The selected video signal VS is one of the video signals V0, V1, V2, V3 and V4.

The scaler 6 includes a plurality of memory areas for temporarily storing video signals. When receiving the selected video signal VS, the scaler 6 stores it in a selected video memory area 6S. The scaler 6 also performs a video distinguishing process to determine which type of video signal the selected video memory area 6S has stored.

For example, to determine which type the selected video signal VS is, the scaler 6 checks if there is a video signal based on the selected video signal VS's frequency, Identifier (ID) signals and the like; the scaler 6 also checks if the selected video signal VS is Interlace or Progressive; the scaler 6 further checks its resolution or the number of scanning lines (480i, 480p, 1080i, 720p or 1080p); the scaler 6 further checks, based on wide signal information, whether the aspect ratio of the image is 4:3, 16:9 Squeeze, 16:9 Letter Box or the like; the scaler 6 further checks what kind of television system (or color system of composite video signal) the selected video signal VS is (NTSC, PAL (Phase Alternation by Line) or SECAM (Sequential Couleure A Memoire)); the scaler 6 further checks whether the selected video signal VS is a motion picture or still image; and the scaler 6 further checks if there are CC (Closed Caption), Info Banner, TELETEXT and the like. The scaler 6 then generates a piece of selected video information IFS from the result of checking. The above checking process will be also referred to as "selected video distinguishing process".

By the way, it may take a bit longer time (a couple of seconds, for example) for the scaler 6 to complete the video distinguishing process in order to check them accurately.

Following the piece of selected video information IFS, the scaler 6 subsequently converts the selected video signal VS into a display video signal VE that is suitable for being displayed on the display section 7, and then supplies the display video signal VE to the display section 7.

The display section 7 for example includes a liquid crystal panel, a drive circuit for driving the liquid crystal panel and the like (all of them not shown). Based on the display video signal VE, the drive circuit generates a drive signal, which is then supplied to the liquid crystal panel. The liquid crystal panel therefore displays the image of the display video signal VE.

By the way, instead of the liquid crystal panel and the drive circuit, the display section 7 may include a plasma display panel and its drive circuit; a FED (Field Emission Display) panel and its drive circuit; or the like.

In addition, the control section 2 controls the input switch 5 to select one of the input terminals P, other than the selected input terminal PS, as a target input terminal PT, and then transmits to the scaler 6 a video signal V supplied from the target input terminal PT as a target video signal VT.

The scaler 6, under the control of the control section 2, performs a video distinguishing process (similar to the one applied to the selected video signal VS) for the target video signal VT to generate a piece of target video information IFT, which is then supplied to the control section 2.

The control section 2 acquires the piece of target video information IFT via the I/O port 13, and then stores it in the storage section 11 as a piece of video information IFn (n: an integer from 0 to 4), which is associated with a corresponding input terminal Pn. For example, if the target input terminal PT is the input terminal P1, the control section 2 stores a piece of target video information IFT in the storage section 11 as a piece of video information IF1. Hereinafter, the above process will be also referred to as "target video distinguishing process".

The control section 2 subsequently chooses another input terminal P as a target input terminal PT and then performs the target video distinguishing process. In this manner, the control section 2 repeats it to monitor video signals V supplied from each input terminal P other than the selected input terminal PS, and then updates each piece of video information IF stored in the storage section 11 accordingly.

In that manner, the control section 2 repeats the video distinguishing process for the video signals V other than the selected video signal VS (those video signals V, other than the selected video signal VS, will be also referred to as "unselected video signals VL") to generate the pieces of video information IF, and then stores them in the storage section 11 or updates those stored in the storage section 11.

When a user operates the operation section 3 to choose another video signal V to display its image on the display section 7 (i.e. when he/she performs an input switching operation to select another input terminal P), the control section 2 displays on the display section 7 an image of a video signal V supplied from the selected input terminal P.

In this case, the control section 2 controls the input switch 5 to transfer the video signal V supplied from the newly selected input terminal PS to the scaler 6 as a newly selected video signal VS.

This time, the scaler 6, under the control of the control section 2, does not perform the video distinguishing process to the newly selected video signal VS. Instead, the control section 2 reads out from the storage section 11 a piece of video information IF corresponding to the newly selected video signal VS, and then supplies it to the scaler 6. The scaler 6 converts the newly selected video signal VS into a display video signal VE by using the piece of video information IF supplied from the control section 2, and then supplies the display video signal VE to the display section 7.

Accordingly, the control section 2 does not have to wait because the scaler 6 does not perform the video distinguishing process for the newly selected video signal VS. Therefore, the control section 2 can immediately convert the newly selected video signal VS into a display video signal VE.

Figure 2:
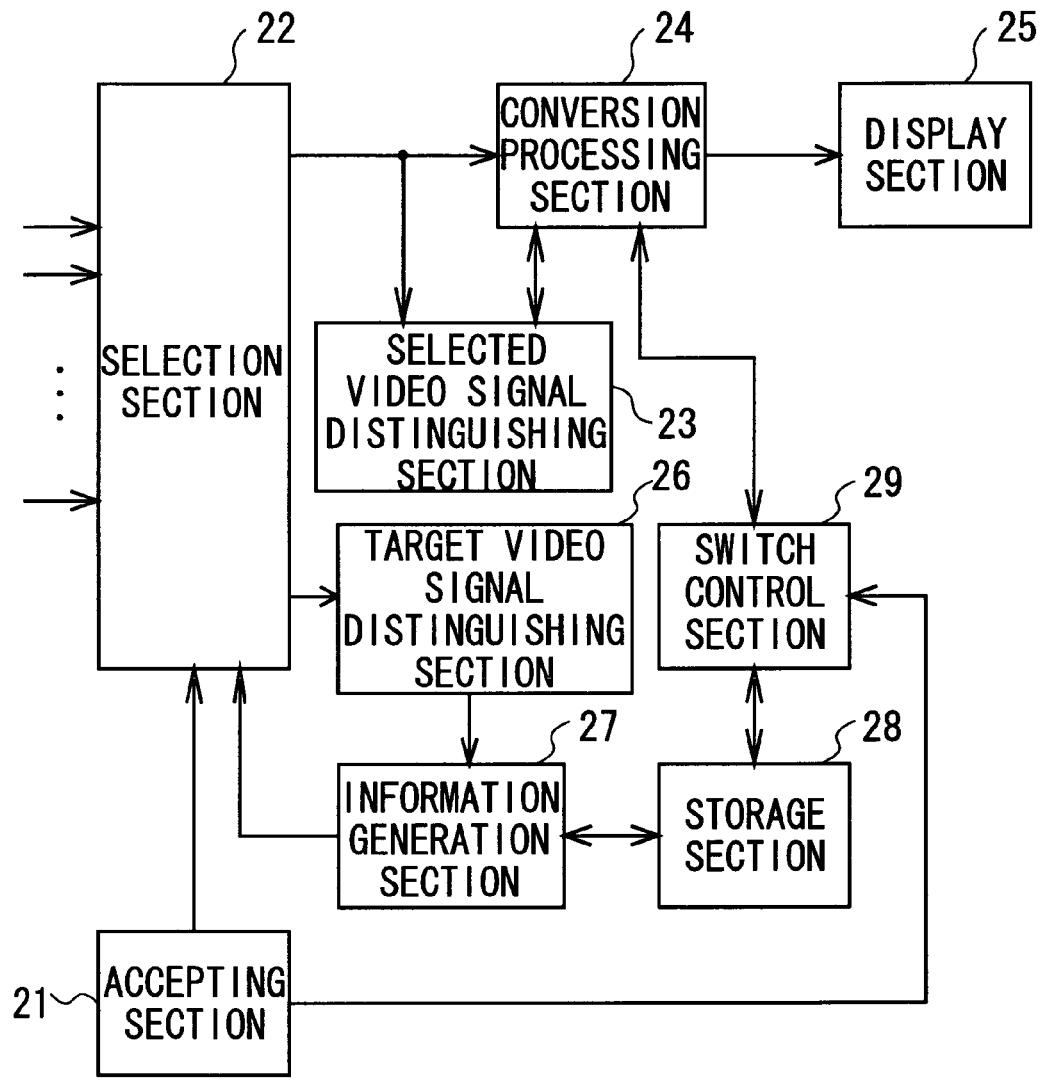
FIG. 2 is a block diagram illustrating the structure of functional blocks according to an embodiment of the present invention.

FIG. 2 is a functional block diagram illustrating each functional block of the television device 1 or a video signal conversion device 20.

The video signal conversion device 22, which is the equivalent of the television device 1 (FIG. 1), includes an accepting section 21, which is the equivalent of the operation section 3 (FIG. 1). The accepting section 21 accepts a selection instruction that specifies a selected video signal VS to be displayed on a display section 25 (which is the equivalent of the display section 7 (FIG. 1)) as an image: The selected video signal VS is the one chosen out of a group of video signals that includes two or more types of video signals. The accepting section 21 then transfers the selection instruction to a selection section 22.

The selection section 22 is the equivalent of the input switch 5 (FIG. 1). When receiving from the accepting section 21 the selection instruction, the selection section 22 regards the video signal specified by the selection instruction as a selected video signal VS, and supplies it to a selected video signal distinguishing section 23 and a conversion processing section 24: The selected video signal distinguishing section 23 and the conversion processing section 24 are the equivalent of the scaler 6.

The selected video signal distinguishing section 23 recognizes the signal type of the selected video signal VS and then supplies the result of recognition to the conversion processing section 24. Based on the result of recognizing the signal type of the selected video signal VS, the conversion processing section 24 converts the selected video signal VS into a display video signal VE that is suitable for being displayed on the display section 25. The conversion processing section 24 subsequently supplies the display video signal VE to the display section 25, which then displays an image.

A target video signal distinguishing section 26 is the equivalent of the scaler 6. Out of the unselected video signals VL, the target video signal distinguishing section 26 sequentially selects each type of video signal V as a target video signal VT and recognizes its type. The target video signal distinguishing section 26 then supplies the result of recognition to an information generation section 27.

The information generation section 27, a storage section 28 and a switch control section 29 are the equivalent of the control section 2. Based on the result of recognition supplied from the target video signal distinguishing section 26, the information generation section 27 generates a piece of video information IF for each type of video signal V and stores them in the storage section 28.

On the other hand, if the accepting section 21 accepts a switching instruction that instructs to select another video signal V as a selected video signal VS, the accepting section 21 supplies the instruction to the selection section 22 and the switch control section 29.

Based on the switching instruction, the selection section 22 selects another video signal V as a selected video signal VS, and then supplies it to the conversion processing section 24. When receiving the switching instruction, the switch control section 29 reads out from the storage section 28 the piece of video information IF corresponding to the another video signal V. Based on the piece of video information IF, the conversion processing section 24 converts the newly selected video signal VS into a display video signal VE.

In that manner, the control section 2 of the television device 1 is designed to repeatedly update the pieces of video information IF stored in the storage section 11, those pieces of video information IF corresponding to the input terminals P other than the selected input terminal PS. Therefore, when requested by a user to switch the signal, the television device 1 can immediately start a conversion process to the newly selected video signal VS and display on the display section 7 an image of the newly selected video signal VS.

Figure 3:
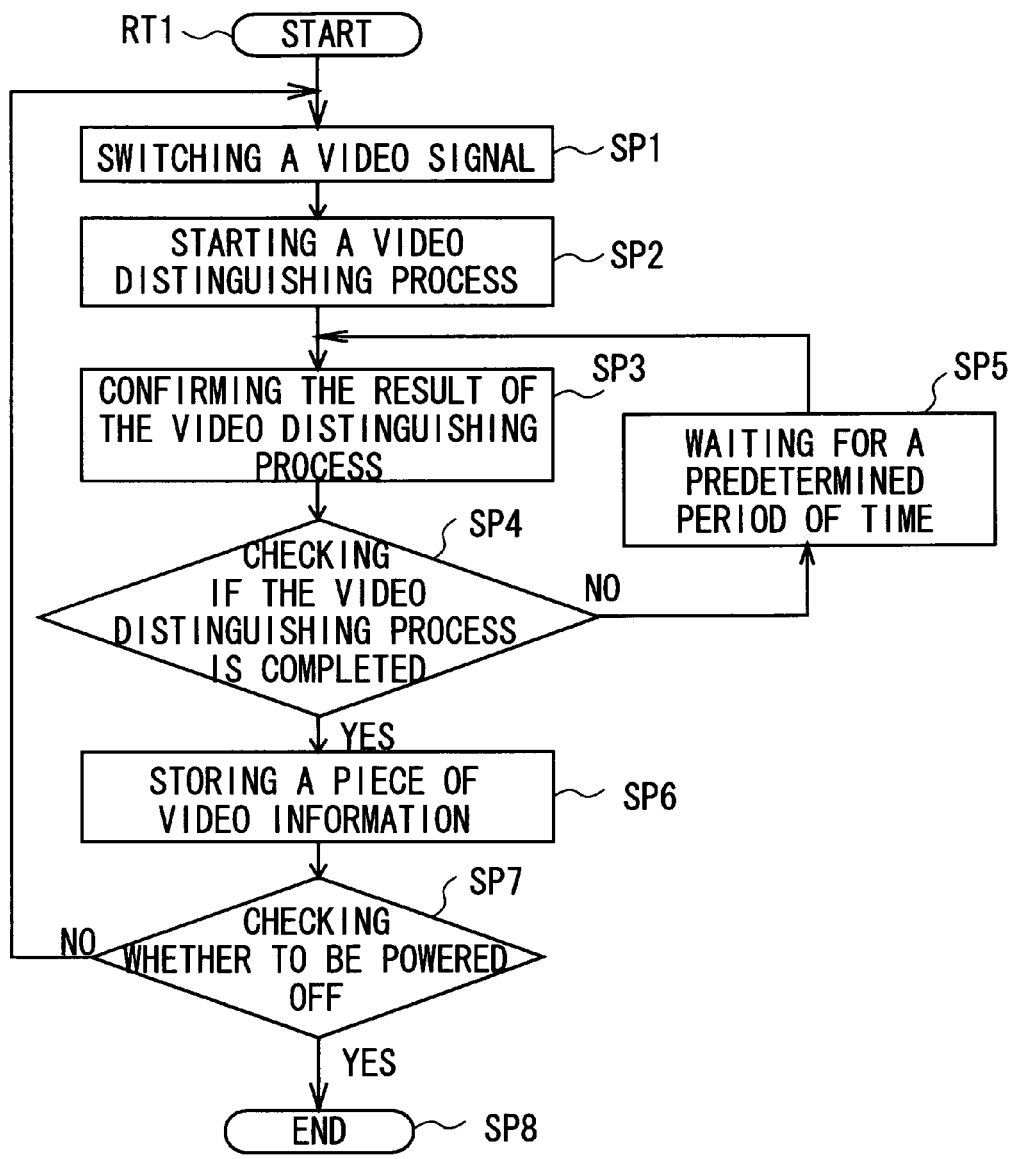
FIG. 3 is a flowchart illustrating a procedure of a video information generation process.

(2) Generation of Video Information and Switching of Video Signals (2-1) Video Information Generation Process FIG. 3 is a flowchart illustrating a generation process of video information IF by the television device 1.

After being powered on, for example, by a user, the control section 2 of the television device 1 starts a procedure RT1 of a video information generation process and then proceeds to step SP1. At step SP1, the control section 2 regards one of the input terminals P, other than the selected input terminal PS, as a target input terminal PT and then transfers the video signal V supplied from the target input terminal PT to the scaler 6 as a target video signal VT. The control section 2 subsequently proceeds to next step SP2.

At step SP2, the control section 2 controls the scaler 6 to start a video distinguishing process for the target video signal VT, and then proceeds to next step SP3.

At step SP3, the control section 2 checks the result of the video distinguishing process, which was performed by the scaler 6 for the target video signal VT, and then proceeds to next step SP4.

At step SP4, the control section checks if the video distinguishing process has been completed. When the negative result was obtained at step SP4, the control section 2 proceeds to step SP5 and waits for a predetermined period of time (10 ms, for example). After that, the control section 2 returns to step SP3. In this manner, the control section 2 waits until the video distinguishing process of the target video signal VT is completed.

On the other hand, when the affirmative result is obtained at step SP4, the control section 2 proceeds to step SP6. At step SP6, the control section 2 acquires from the scaler 6 a piece of target video information IFT indicating the result of the video distinguishing process to the target video signal VT. The control section 2 then stores the piece of target video information IFT in the storage section 11 as a piece of video information IFn, such that it is associated with an input terminal Pn, the one selected as the target input terminal PT at that time. The control section 2 subsequently proceeds to next step SP7.

At step SP7, the control section 2 checks whether the television device 1 is powered off by a user. If the negative result is obtained at step SP7, this means that a user is still watching the television device 1; the control section 2 therefore returns to step SP1 to update the pieces of video information IFn again. At this time, the control section 2 at step SP1 selects another input terminal P as a new target input terminal PT, so that the input terminals P2, P3 and P4 will be sequentially checked, for example.

On the other hand, when the affirmative result is obtained at step SP7, this means that the control section 2 does not have to update the pieces of video information IFn anymore. In this case, the control section 2 proceeds to next step SP8 to end the procedure RT1.

(2-2) Video Signal Switching Process

Figure 4:
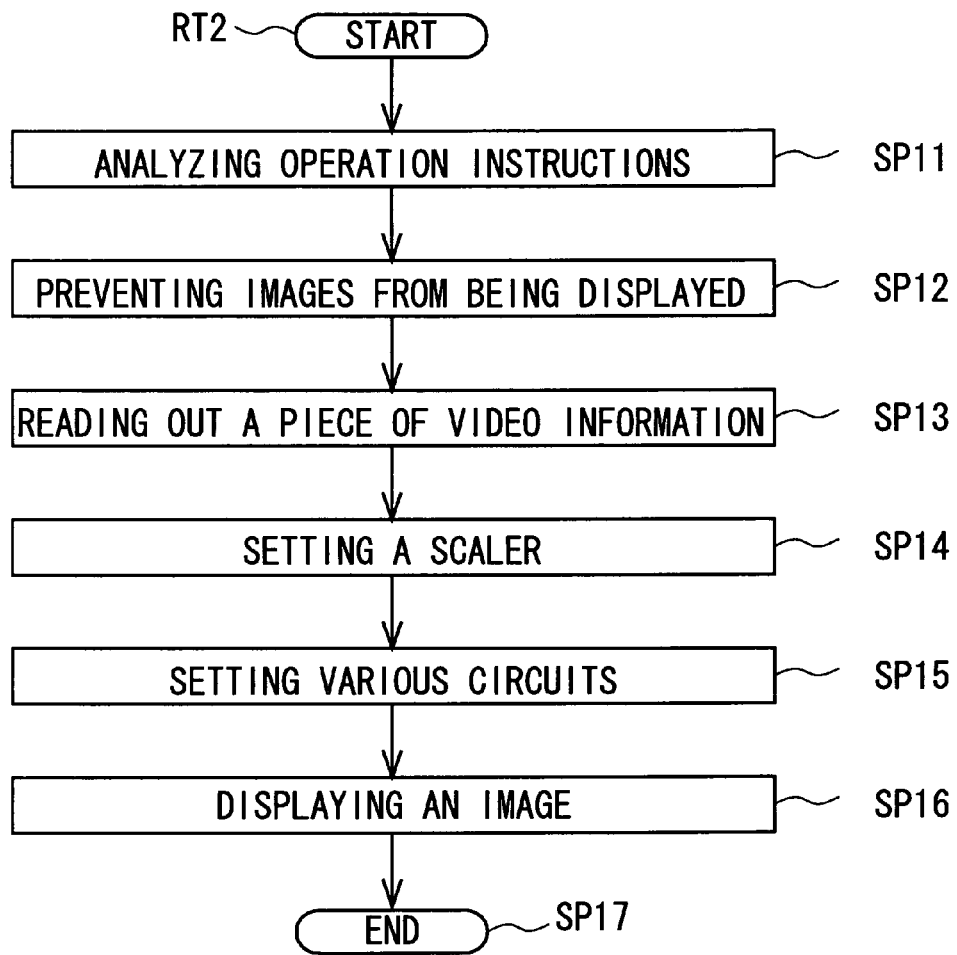
FIG. 4 is a flowchart illustrating a procedure of a video signal switching process.

FIG. 4 is a flowchart illustrating a switching process for switching the selected video signal VS by the television device 1.

When a user for example performs an input switching operation to the operation section 3 to switch the selected video signal VS, the control section 2 starts a procedure RT2 of a video signal switching process and then proceeds to step SP11. At step SP11, the control section 2 recognizes, by analyzing the input switching operation, an input terminal P to be selected, and then proceeds to next step SP12.

At step SP12, the control section 2 controls the scaler 6 to supply to the display section 7 a display image signal VE, which has been generated from a vanishing screen signal that prevents any images from being displayed. Therefore, the display section 7 does not temporarily display any images based on the selected video signal VS. The control section 2 subsequently proceeds to next step SP13.

At step SP13, the control section 2 reads out from the storage section 11 a piece of video information IF corresponding to the input terminal P, which is going to be selected at this time. The control section 2 then proceeds to next step SP14.

At step SP14, based on the piece of video information IF read out from the storage section 11, the control section 2 adjusts the settings of the scaler 6 to convert the newly selected video signal VS into a display video signal VE, and then proceeds to step SP15.

By the way, the settings adjusted by the control section 2 at step SP14 for example include: the number of pixels in the horizontal and vertical directions of the screen about the frequency of the video signal; the coefficients of horizontal and vertical positions of the screen about the information of wide signals; the coefficients of non-linear process; the state of color separation on the television system (Composite, Y/C Separation or Y/Cb/Cr Separation); the settings of comb filter; the checking of the state of images about whether edge effect should be put dynamically; and the settings about whether CC, Info Banner, TELETEXT or the like should be enabled.

At step SP15, the control section 2 adjusts the settings of various circuits including an audio processing circuit (not shown) in response to the switching of the selected input terminal PS, and then proceeds to next step SP16.

At step SP16, the control section 2 converts, by using the scaler 6, the newly selected video signal VS into a display video signal VE to display on the display section 7 an image of the newly selected video signal VE, and then proceeds to next step SP17 to end the procedure RT2.

(3) Operation and Effect

With the above configuration, the control section 2 of the television device 1 controls the scaler 6 and performs a video distinguishing process to recognize the signal type of a selected video signal VS supplied from an input terminal PS selected by a user who controlled the operation section 3. The control section 2 subsequently performs a conversion process in accordance with the recognized signal type to produce a display video signal VE, and supplies the display video signal VE to the display section 7, which then displays an image of the display video signal VE.

While performing the above process, the control section 2 also regards each input terminal P, other than the selected input terminal PS, as a target input terminal PT one after another, and then transfers a video signal V supplied from the target input terminal PT to the scaler 6 via the input switch 5 as a target video signal VT. The control section 2 recognizes, by using the scaler 6, the signal type of the target video signal VT. Based on the recognized signal type, the control section 2 generates a piece of target video information IFT and stores it in the storage section 11 such that it is associated with the input terminal P.

After that, when accepting an input switching operation from the operation section 3, the control section 2 reads out from the storage section 11 a piece of video information IF corresponding to the newly selected input terminal PS and then starts a conversion process of converting the newly selected video signal VS into a display video signal VE in accordance with the piece of video information IF without performing any distinguishing process for the newly selected video signal VS.

Therefore, after accepting the input switching operation, the control section 2 of the television device 1 can immediately start the conversion process before the video distinguishing process is completed, allowing the display section 7 to display an image of the newly selected video signal VS immediately.

That reduces the response time, the amount of time the control section 2 spends in displaying an image on the display section 7 after accepting the input switching operation from a user. This decreases discomfort in users waiting for images to be displayed.

Moreover, since the pieces of video information IF of all the input terminals P, except the selected input terminal PS, are stored in the storage section 11, the control section 2 can perform the conversion process of converting a newly selected video signal VS into a display video signal VE immediately after the input terminal P is switched by a user.

Furthermore, the control section 2 updates the pieces of video information IF continuously. Accordingly, even if the video devices D1 to D4 connected to the television device 1 are replaced with other video devices, the pieces of video information IF related to them are updated immediately based on the video signals V input from them. Based on those updated pieces of video information IF stored in the storage section 11, the video signals V supplied from the new video devices can be accurately converted into display video signals VE.

Furthermore, during the process of selecting another video signal VS, which may cause noise, the control section 2 displays on the display section 7 an image based on the vanishing screen signal and therefore prevents noise and fuzzy images from being displayed, preventing a user from feeling discomfort.

According to the above configuration, the control section 2 of the television device 1, by using the scaler 6, performs the conversion process in line with the signal type of the selected video signal VS supplied from the input terminal PS selected by the user to convert the selected video signal VS into the display video signal VE; the control section 2 subsequently displays on the display section 7 the image of the selected video signal VS; the control section 2 meanwhile recognizes, by using the scaler 6, the signal type of each video signal V (or the target video signal V) input into the input switch 5, other than that of the selected video signal VS; the control section 2 then memorizes the recognized type as a piece of video information IF in the storage section 11 such that it is associated with the corresponding input terminal P; when accepting the input switching operation from the user, the control section 2 reads out from the storage section 11 the piece of video information IF corresponding to the newly selected input terminal PS; the control section 2 then starts the conversion process of converting the newly selected video signal VS into the display video signal VE in accordance with the piece of video information IF and then displays the image of the newly selected video signal VS on the display section 7 immediately.

(4) Other Embodiment

In the above-noted embodiment, the television 1 includes four input terminals P1 to P4. However, the present invention is not limited to this. The television 1 may include two ore more input terminals P. In the above case, the input terminals P are those transferring the video signals V from the outside video devices D1 to D4 and the like into the television device 1. However, the receiving and processing section 4 (FIG. 1) or other circuits inside the television device 1 that can supply a video signal to the television device 1 could be also served as an input terminal P.

Moreover, in the above-noted embodiment, the video distinguish process is performed on all the unselected video signals VL, or the video signals V supplied from all the input terminals P except the selected input terminal PS, and the pieces of video information IF related to them are stored and updated. However the present invention is not limited to this. For example, by adjusting the setting of the television device 1, one or some of the input terminals P a user does not have any intention to use may be exempted from the video distinguishing process, while the other unselected video signals VL the user has an intention to use are processed in the video distinguishing process, thereby the pieces of video information IF related to them being stored and updated.

Furthermore, in the above-noted embodiment, the unselected video signals VL are sequentially and therefore evenly processed in the video distinguishing process, thereby the pieces of video information IF related to them being stored and updated. However, the present invention is not limited to this. For example, some of the input terminals P could be more frequently processed in the video distinguishing process than the other terminals, depending on the settings set by a user.

Furthermore, in the above-noted embodiment, the pieces of selected video information IFS and target video information IFT contain: information about whether there is a video signal as for the video signal V; information about whether it is Interlace or Progressive; its resolution or the number of scanning lines; the aspect ratio of the screen; the type of television system; information about whether it is a motion picture or still image; and information about whether it has CC, Info Banner, TELETEXT and the like. However, the present invention is not limited to this. The pieces of selected video information IFS and target video information IFT may include other kinds of information used for converting the video signal V into a display video signal VE.

Furthermore, in the above-noted embodiment, the above method is applied to the television device 1. However, the present invention is not limited to this. The above method may be applied to various electronic devices that are designed to select one or some of the video signals in line with the user's instruction, such as a monitor device for a computer or a video signal switcher for a computer.

Furthermore, in the above-noted embodiment, the video signal conversion device 20, which is the equivalent of a video signal conversion device, includes: a selection section 22, which is the equivalent of a selection section; the selected video signal distinguishing section 23, which is the equivalent of a selected video signal distinguishing section; the conversion processing section 24, which is the equivalent of a conversion processing section; the target video signal distinguishing section 26, which is the equivalent of a target video signal distinguishing section; the information generation section 27, which is the equivalent of an information generation section; and the switch control section 29, which is the equivalent of a switch control section. However, the present invention is not limited to this. The video signal conversion device may be configured in a different manner such that it keeps the functions of the selection section, the selected video signal distinguishing section, the conversion processing section, the target video signal distinguishing section, the information generation section and the switch control section.

The above method can be also applied to a television device that is designed to choose one of the video signals input and display its image.

It should be understood by those skilled in the art that various modifications, combinations, sub-combinations and alterations may occur depending on design requirements and other factors insofar as they are within the scope of the appended claims or the equivalents thereof.

What is claimed is:

1. A video signal conversion device comprising:
    a selection section that selects a selected video signal out of two or more video signals input in accordance with a selecting instruction supplied from a predetermined operation section;
    a selected video signal distinguishing section that recognizes the signal type of the selected video signal;
    a conversion processing section that converts, in accordance with the result of recognizing the signal type of the selected video signal, the selected video signal into a display signal format suitable for a predetermined display section and then supplies the converted signal to the display section;
    a target video signal distinguishing section that controls the selection section to select a target video signal from a group of unselected video signals not including the selected video signal, and then recognizes the signal type of the target video signal;
    an information generation section that generates a piece of video information from the result of recognizing the signal type of the target video signal and then stores the piece of video information in a predetermined storage section; and
    a switch control section that reads out, when accepting from the operation section a switching instruction that instructs to select another video signal as a selected video signal, a piece of video information corresponding to the another video signal from the storage section and then controls the conversion processing section to convert the another video signal into the display signal format in accordance with the piece of video information,
    in which the signal type of a first selected video signal is recognized by use of a first procedure and the signal type of a second selected video signal which is subsequent to the first selected video signal is recognized by use of a second procedure,
    in which the first procedure is a video distinguishing process which includes performing a checking operation to determine a number of parameters associated with the respective video signal, and in which the second procedure utilizes the respective piece of video information from the storage section and does not include performing the video distinguishing process of the first procedure,
    in which the target video signal distinguishing section controls the selection section to select another unselected video signal as a target video signal, and
    in which the operation section is operable to supply a frequency signal so as to cause a frequency at which each video signal from the group of unselected video signals is processed by the target video signal distinguishing section to be varied in accordance with an input from a user such that the frequency of processing for a first video signal from the group of unselected video signals is different than that for a second video signal from the group of unselected video signals.

2. The video signal conversion device according to claim 1, wherein:
    the information generation section stores the pieces of video information corresponding to the target video signals in the storage section.

3. The video signal conversion device according to claim 2, wherein:
    the target video signal distinguishing section controls the selection section to select all the unselected video signals as target video signals; and
    the information generation section stores the pieces of video information of all the target video signals in the storage section.

4. The video conversion device according to claim 1, wherein
    when accepting from the operation section the switching instruction, the conversion processing section switches a video signal supplied to the display section from the selected video signal to that of a predetermined temporary image and, after a predetermined period of time, to the another video signal.

5. A video signal conversion method of a video signal conversion device that selects a selected video signal out of two or more video signals input in accordance with a selecting instruction supplied from a predetermined operation section, recognizes the signal type of the selected video signal, converts, in accordance with the result of recognition, the selected video signal into a display signal format suitable for a predetermined display section and then supplies the converted signal to the display section, the video signal conversion method comprising:
    a selection step of selecting a target video signal from a group of unselected video signals not including the selected video signal;

a distinguishing step of recognizing the signal type of the target video signal;

an information generation step of generating a piece of video information from the result of recognizing the signal type of the target video signal and storing the piece of video information in a predetermined storage section; and a switch control step of reading out, when accepting from the operation section a switching instruction that instructs to select another video signal as a selected video signal, a piece of video information corresponding to the another video signal from the storage section, converting the another video signal into the display signal format in accordance with the piece of video information and supplying the converted signal to the display section, in which the signal type of a first selected video signal is recognized by use of a first procedure and the signal type of a second selected video signal which is subsequent to the first selected video signal is recognized by use of a second procedure, in which the first procedure is a video distinguishing process which includes performing a checking operation to determine a number of parameters associated with the respective video signal, and in which the second procedure utilizes the respective piece of video information from the storage section and does not include performing the video distinguishing process of the first procedure, in which during operation another unselected video signal is selected as a target video signal, and in which the operation section is operable to supply a frequency signal so as to cause a frequency at which each video signal from the group of unselected video signals is processed by the distinguishing step to be varied in accordance with an input from a user such that the frequency of processing for a first video signal from the group of unselected video signals is different than that for a second video signal from the group of unselected video signals.

6. A video display device comprising:

a selection section that selects a selected video signal out of two or more video signals input in accordance with a selecting instruction supplied from a predetermined operation section;

a selected video signal distinguishing section that recognizes the signal type of the selected video signal;

a conversion processing section that converts, in accordance with the result of recognizing the signal type of the selected video signal, the selected video signal into a predetermined display signal format and then regards the converted signal as a display video signal;

a display section that displays an image of the display video signal;

a target video signal distinguishing section that controls the selection section to select a target video signal from a group of unselected video signals not including the selected video signal, and then recognizes the signal type of the target video signal;

an information generation section that generates a piece of video information from the result of recognizing the signal type of the target video signal and then stores the piece of video information in a predetermined storage section; and a switch control section that reads out, when accepting from the operation section a switching instruction that instructs to select another video signal as a selected video signal, a piece of video information corresponding to the another video signal from the storage section and then controls the conversion processing section to convert the another video signal into the display signal format in accordance with the piece of video information, in which the signal type of a first selected video signal is recognized by use of a first procedure and the signal type of a second selected video signal which is subsequent to the first selected video signal is recognized by use of a second procedure, in which the first procedure is a video distinguishing process which includes performing a checking operation to determine a number of parameters associated with the respective video signal, and in which the second procedure utilizes the respective piece of video information from the storage section and does not include performing the video distinguishing process of the first procedure, in which the target video signal distinguishing section controls the selection section to select another unselected video signal as a target video signal, and in which the operation section is operable to supply a frequency signal so as to cause a frequency at which each video signal from the group of unselected video signals is processed by the target video signal distinguishing section to be varied in accordance with an input from a user such that the frequency of processing for a first video signal from the group of unselected video signals is different than that for a second video signal from the group of unselected video signals.

* * * * *